United States Patent

Takashima

[11] Patent Number: 5,804,790
[45] Date of Patent: Sep. 8, 1998

[54] HOT ROLLING METHOD

[75] Inventor: Koichi Takashima, Toyonaka, Japan

[73] Assignee: Kyoei Steel Co., Ltd., Osaka Pref., Japan

[21] Appl. No.: 571,434

[22] Filed: Dec. 13, 1995

[30] Foreign Application Priority Data

Nov. 21, 1995 [JP] Japan .................................. 7-326346

[51] Int. Cl.$^6$ ............................. B23K 11/00; B21B 1/46
[52] U.S. Cl. ...................................... 219/117.1; 29/527.7
[58] Field of Search .................................. 219/55, 78.16, 219/79, 80, 117.1; 29/33 B, 33 P, 33 Q, 33 S, 527.5, 527.7; 228/158, 159

[56] References Cited

U.S. PATENT DOCUMENTS

| | | | |
|---|---|---|---|
| 4,294,394 | 10/1981 | Iida et al. ................................ | 228/158 |
| 4,577,384 | 3/1986 | Bricmont .................................. | 29/460 |
| 4,626,647 | 12/1986 | Takeda et al. ............................ | 219/97 |
| 4,850,522 | 7/1989 | Nichols ................................... | 228/159 |
| 5,222,282 | 6/1993 | Sukonnik et al. ....................... | 29/17.9 |
| 5,463,801 | 11/1995 | Kajiwara et al. ........................ | 29/33 Q |
| 5,564,178 | 10/1996 | Takashima et al. .................... | 29/527.7 |

Primary Examiner—Matthew V. Nguyen
Attorney, Agent, or Firm—Wenderoth, Lind & Ponack, L.L.P.

[57] ABSTRACT

To make it possible to not only improve yield ratio by eliminating loss of material but to also improve the productivity and quality accuracy of products, the hot rolling method of the present invention consists essentially of treating the rear end face of the preceding rolled material being rolled in the finishing mill and the front end face of the subsequent rolled material being rolled by the roughing-down mill in a way to be fit for welding, putting the front end face of the subsequent rolled material in contact with the rear end face of the preceding rolled material by setting the feed speed of the rolled material being rolled by the roughing-down mill faster than the feed speed of the preceding rolled material, pinching the contact faces of the two rolled materials from the top and bottom directions by means of a pressure welding mechanism, welding both rolled materials between the roughing-down mill and the finishing mill while performing resistance heating with the application of voltage under pressure with said pressure welding mechanism, and continuously rolling the welded rolled materials with the finishing mill to form them into steel sheets.

6 Claims, 3 Drawing Sheets

HOT ROLLING METHOD

BACKGROUND OF THE INVENTION

The present invention relates to a hot rolling method for forming steel sheets by rolling cast pieces such as slabs, etc. (hereinafter referred to as "sheet bars").

Conventionally, in hot rolling methods for forming steel sheets by rolling sheet bars in a rolling system composed of a roughing-down mill, a finishing mill, etc. after heating them in a heating system, the size (weight) of the steel sheets produced is determined by the size (weight) of the sheet bars. This makes it necessary to adjust the size of the sheet bars to the size of steel sheet products in order to manufacture steel sheet products of specified size (weight) with high accuracy and little material loss.

However, it is practically impossible to adjust the size of the sheet bars to the size of the steel sheet products, and this results, at least, in unevenness in the size of the steel sheet products formed from the final cut pieces of a single sheet bar.

In this way, the conventional hot rolling method, which brings about unevenness in the size of the steel sheet products formed from the final cut pieces of sheet bar, has the problem of not only producing a large loss of material, but also of lowering productivity and quality accuracy because of the mixing of uneven products and the intermittent rolling for each sheet bar in the rolling system.

SUMMARY OF THE INVENTION

The purpose of the present invention is to provide a hot rolling method which can solve the problems of said conventional hot rolling method, improve the yield ratio by reducing material loss and improve productivity and quality accuracy of products.

To achieve said purpose, the hot rolling method of the present invention is characterized in that it consists essentially of treating the rear end face of the preceding rolled material being rolled in the finishing mill and the front end face of the subsequent rolled material being rolled by the roughing-down mill in a way to be fit for welding, putting the front end face of the subsequent rolled material in contact with the rear end face of the previous rolled material by setting the feed speed of the rolled material being rolled by the roughing-down mill faster than the feed speed of the preceding rolled material, pinching the contact faces of the two rolled materials from the top and bottom directions by means of a pressure welding mechanism, welding both rolled materials between the roughing-down mill and the finishing mill while performing resistance heating with the application of voltage under pressure with said pressure welding mechanism, and continuously rolling the welded rolled materials with the finishing mill to form them into steel sheets.

For such cases, to put the front end face of the subsequent rolled material in contact with the rear end face of the preceding rolled material, the feed speed of the roughing-down mill is set faster than the feed speed of the finishing mill when the subsequent rolled material is long and being rolled by the roughing-down mill, and the feed speed of the carrying table installed in linkage with the roughing-down mill is set faster than the feed speed of the finishing mill when the subsequent rolled material is short and being sent out on the carrying table after completion of its rolling by the roughing-down mill.

Moreover, it is desirable to set, after the front end face of the subsequent rolled material comes in contact with the rear end face of the preceding rolled material, the feed speed of the subsequent rolled material at the same feed speed as that of the preceding rolled material.

According to the hot rolling method of the present invention, because the preceding rolled material and the subsequent rolled material are welded between the roughing-down mill and the finishing mill, where the rolled materials are hot and in a state of rolling in which the surface area of the end face of the rolled materials is of a size suitable for welding (if the surface area of the end face of the rolled materials is large, it is difficult to perform uniform welding in a short time) and that the welded rolled materials are continuously rolled by the finishing mill, it is possible to weld rolled materials to each other in a short time easily and highly accurately without having any influences on the other processes, to produce steel sheet products of specified size (weight, length) without loss of material, and to improve productivity and quality accuracy of products in combination with the possibility of continuous rolling in the rolling system.

Furthermore, the hot rolling method of the present invention, realized in a way to put the front end face of the subsequent rolled material in contact with the rear end face of the preceding rolled material by setting the feed speed of the roughing-down mill or the carrying table installed in linkage with the roughing-down mill faster than the feed speed of the finishing mill, is capable of welding the rolled materials between the roughing-down mill and the finishing mill, regardless of the length of the material being rolled by the roughing-down mill.

Still, it is also possible to weld rolled materials with higher accuracy by setting, after the front end face of the subsequent rolled material comes in contact with the rear end face of the preceding rolled material, the feed speed of the subsequent rolled material at the same speed as that of the preceding rolled material.

DETAILED DESCRIPTION OF THE INVENTION

An embodiment of the hot rolling method according to the present invention is described based on drawings hereafter.

Figure 1:
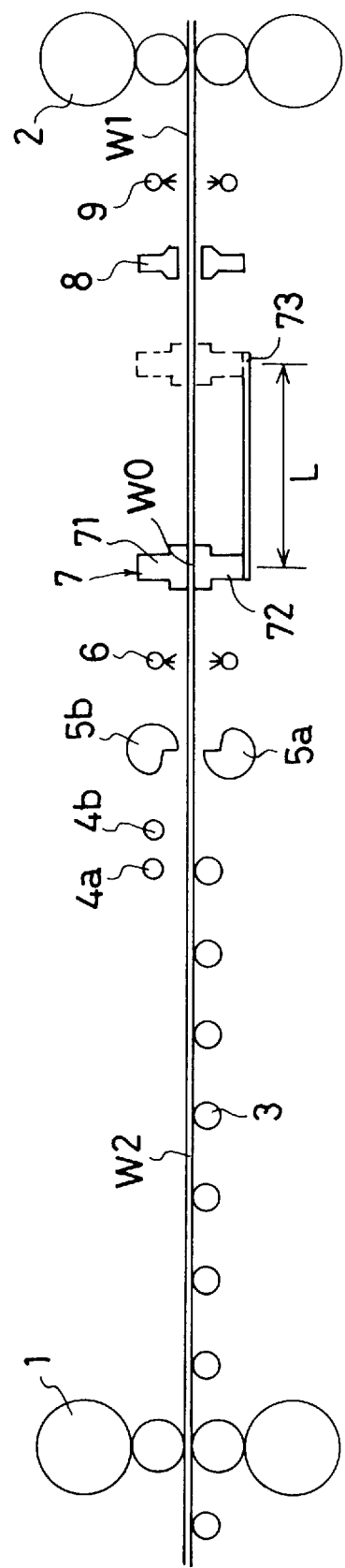
FIG. 1 is a side view showing an example of the system for implementing the hot rolling method according to the present invention.

FIG. 1 illustrates an example of the system used for implementing the hot rolling method according to the present invention.

This system is composed of a carrying table 3, a contact or non-contact type sensor 4a, 4b for detecting the preceding rolled material W1 being rolled by the finishing mill 2 and the subsequent rolled material W2 being rolled by the roughing-down mill 1, a flying crop shears 5a, 5b and descaler 6 for treating the rear end face of the preceding rolled material W1 and the front end face of the subsequent rolled material in a way to be fit for welding, a pressure welding mechanism 7 for welding the rear end face of the preceding rolled material and the front end face of the subsequent rolled material W2 as well as a chipping mechanism 8 and descaler 9 for chipping and smoothing the projected part on the surface of the contact face (welded part) of the rolled material pressure welded by the pressure welding mechanism 7 provided between the roughing-down mill 1 and the finishing mill 2 installed in linkage with a heating system (not illustrated) for heating and feeding sheet bars supplied from a known sheet bar feed system.

The roughing-down mill 1 and the finishing mill 2 may be installed in plural numbers, as required.

Moreover, on the finishing mill 2 are installed in linkage therewith as required a known rolled product carrying table for conveying formed steel sheets and a down coiler for winding the steel sheets in the form of coils (not illustrated).

The pressure welding mechanism 7, which is designed to pinch and pressurize the rear end part of the preceding rolled material W1 and the front end part of the subsequent rolled material W2 including the contact part between the rear end face of the preceding rolled material W1 and the front end face of the subsequent rolled material W2 from the top and bottom directions and weld both rolled materials W1, W2 between the roughing-down mill 1 and the finishing mill 2 (carrying distance of rolled materials W1, W2: L) while performing resistance heating with a low-voltage large current with the application of a low-voltage, is composed of pressurizing members 71, 72 provided above and below the rolled materials W1, W2 and a guide member 73 for supporting both pressurizing members 71, 72 movably along the direction of conveyance of the rolled materials.

In that case, both pressurizing members 71, 72 are provided with drive mechanisms such as hydraulic cylinder, etc. so that they may adjust the pressurizing force of rolled materials W1, W2 depending on the size, thickness, etc. of rolled materials W1, W2 and constructed in a way to be capable of adjusting the voltage (or current) to be applied to the rolled materials W1, W2.

Moreover, it is also possible to a provide shield mechanism (not illustrated) covering the flying crop shears 5a, 5b, the descaler 6 and the pressure welding mechanism 7 so that the welding of the rolled materials may be performed in an inert gas atmosphere, such as nitrogen gas, etc.

Next, an explanation will be given for the hot rolling method using said equipment based on FIG. 2. FIG. 2 indicates the relative position of the two rolled materials W1, W2 (with reference to the preceding rolled materials W1).

This method consists of rolling the sheet bar heated and supplied by the heating system to a prescribed thickness and width by the roughing-down mill 1 and then further rolling it to the prescribed thickness and width by the finishing mill 2.

Figure 2A:
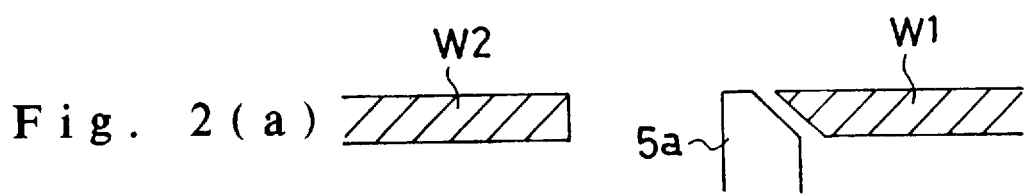
FIGS. 2(a)–(f) process explanatory drawings of the hot rolling method of the present invention.
Figure 2B:
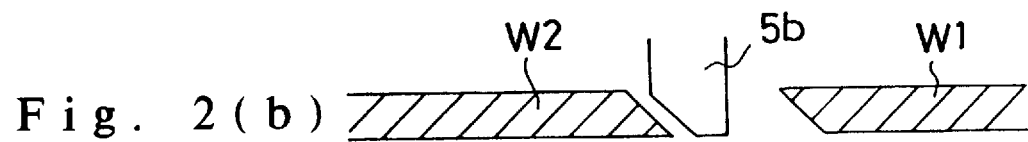
Figure 2C:
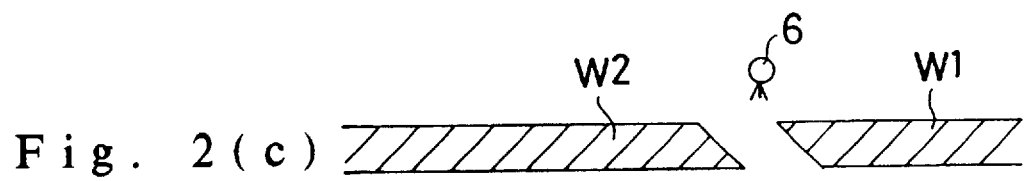

At that time, the rear end face of the preceding rolled material W1 being rolled in the finishing mill 2 is formed on a downward looking (or upward looking) inclined face by means of the flying crop shear 5a (FIG. 2(a)), and the front end face of the subsequent rolled material W2 being rolled in the roughing-down mill 1 is formed on an upward looking (or downward looking) inclined face by means of the flying crop shears 5b (FIG. 2(b)), and the end face of both rolled materials W1, W2 are further descaled with the descaler 6 (FIG. 2(c)) so that they may be treated to be fit for welding.

Figure 2D:
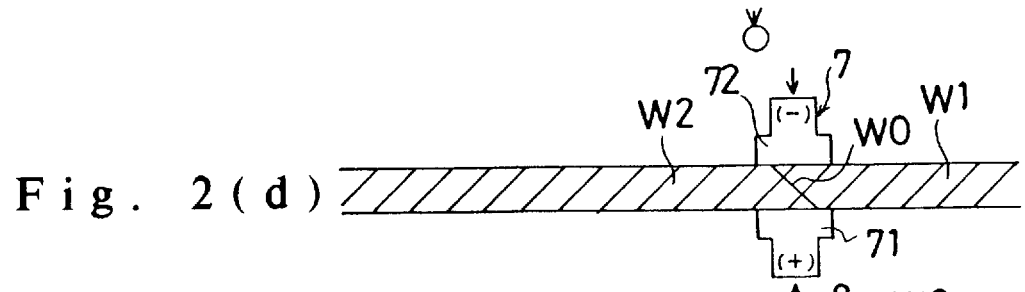

This method further consists of detecting the preceding rolled material W1 being rolled by the finishing mill 2 and the subsequent rolled material W2 being rolled by the roughing-down mill 1 by means of a contact or non-contact type sensor 4a, 4b to obtain control information such as speed of the two rolled materials W1, W2, distance between the two rolled materials W1, W2, etc., and based on that information, setting the feed speed of the roughing-down mill 1 (200–300 m/s, for example) faster than the feed speed of the finishing-down mill 2 (15–50 m/s), i.e. setting the feed speed of the subsequent rolled material W2 faster than the feed speed of the preceding rolled material W1 to put the front end face of the subsequent rolled material W2 in contact with the rear end face of the preceding rolled material W1, and welding both rolled materials W1, W2 between the roughing-down mill 1 and the finishing mill 2 by pinching and pressurizing the contact parts W0 of the two rolled materials W1, W2 from the top and bottom directions by means of the pressurizing members 71, 72 while performing resistance heating with the application of voltage (FIG. 2(d)).

In that case, it is desirable to set, when the front end face of the subsequent rolled material W2 comes in contact with the rear end face of the preceding rolled material W1, the feed speed of the subsequent rolled material W2 at the same feed speed as that of the preceding rolled material W1, to prevent, at the time of welding, both rolled materials W1, W2 from being bent between the roughing-down mill 1 and the finishing mill 2.

Figure 2E:
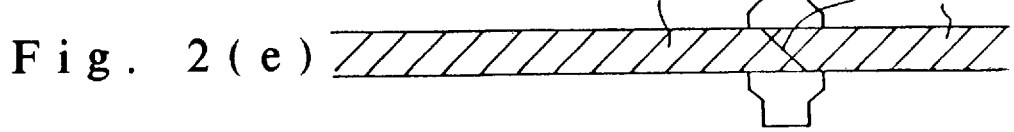
Figure 2F:

After that, the projected part on the surface of the contact face (welded part) W0 of the rolled materials welded by the pressure welding mechanism 7 is chipped with the chipping mechanism 8 and the descaler 9 to a smooth finish (FIG. 2(e)), to complete the welding of the rolled materials W1, W2 (FIG. 2(f)).

The welded rolled materials are continuously rolled by the finishing mill 2 to be formed into steel sheets.

In the same way, it is possible to continuously perform the rolling work thereafter by welding the subsequent rolled materials one after another between the roughing-down mill 1 and the finishing mill 2.

Figure 3:
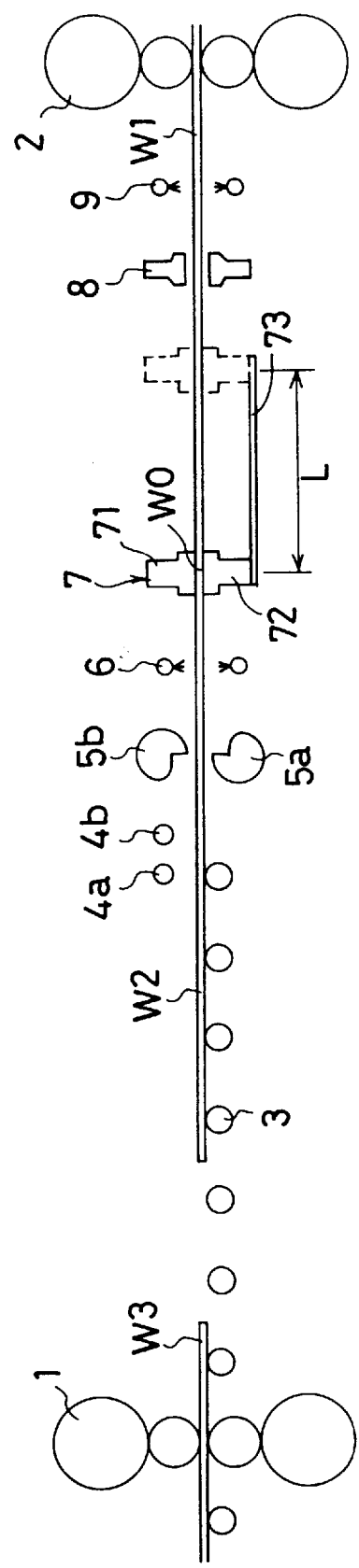
FIG. 3 is a side view showing an example of the system for implementing the hot rolling method according to the present invention.

While said hot rolling method was explained for a case where the subsequent rolled material is a long one, i.e. a case where the subsequent rolled material W2 is being rolled in the roughing-down mill 1 when the front end face of the subsequent rolled material W2 comes in contact with the rear end face of the preceding rolled material W1, the hot rolling method of the present invention is not limited to it, but is also applicable to cases where the subsequent rolled materials are short, i.e. a case where the rolling of the subsequent rolled material W2 in the roughing-down mill 1 is completed and the subsequent rolled material W2 is already being sent out on the carrying table provided in linkage with the roughing-down mill 1 before the front end face of the subsequent rolled material W2 comes in contact with the rear end face of the preceding rolled material W1 (the subsequent rolled material W3 is being rolled by the roughing-down mill 1), as shown in FIG. 3.

And, in such a case, it becomes possible to put the front end face of the subsequent rolled material W2 in contact with the rear end face of the preceding rolled material W1 and weld the two rolled materials between the roughing-down mill 1 and the finishing mill 2, in the same way as above, by setting the feed speed of the carrying table 3 provided in linkage with the roughing-down mill 1 faster than the feed speed of the finishing mill 2.

What is claimed is:

1. A hot rolling method which consists essentially of treating a rear end face of a preceding rolled material being rolled in a finishing mill and a front end face of a subsequent rolled material being rolled by a roughing-down mill in a way to be fit for welding, putting the front end face of the subsequent rolled material in contact with the rear end face of the preceding rolled material by setting the feed speed of the material being rolled by the roughing-down mill faster than the feed speed of the preceding rolled material, pinching the contact faces of the two rolled materials from the top and bottom directions by means of a pressure welding mechanism, welding both rolled materials between the roughing-down mill and the finishing mill while performing resistance heating with the application of voltage under pressure with said pressure welding mechanism, and continuously rolling the welded rolled materials with the finishing mill to form them into steel sheets.

2. A hot rolling method as defined in claim 1, wherein the front end face of the subsequent rolled material is put in contact with the rear end face of the preceding rolled material by setting the feed speed of the roughing-down mill faster than the feed speed of the finishing-down mill.

3. A hot rolling method as defined in claim 1, wherein the front end face of the subsequent rolled material is put in contact with the rear end face of the preceding rolled material by setting the feed speed of a carrying table provided in linkage with the roughing-down mill faster than the feed speed of the finishing mill.

4. A hot rolling method as defined in claim 1, wherein, after the front end face of the subsequent rolled material has been put in contact with the rear end face of the preceding rolled material, the feed speed of the subsequent rolled material is set at the same speed as the feed speed of the preceding rolled material.

5. A hot rolling method as defined in claim 2, wherein, after the front end face of the subsequent rolled material has been put in contact with the rear end face of the preceding rolled material, the feed speed of the subsequent rolled material is set at the same speed as the feed speed of the preceding rolled material.

6. A hot rolling method as defined in claim 3, wherein, after the front end face of the subsequent rolled material has been put in contact with the rear end face of the preceding rolled material, the feed speed of the subsequent rolled material is set at the same speed as the feed speed of the preceding rolled material.

\* \* \* \* \*